(12) United States Patent
Upadhyay et al.

(10) Patent No.: US 10,860,429 B1
(45) Date of Patent: Dec. 8, 2020

(54) CENTRALIZED RETENTION AND BACKUP DELETIONS

(71) Applicant: EMC IP Holding Company LLC, Hopkinton, MA (US)

(72) Inventors: Navneet Upadhyay, Ghaziabad (IN); Amith Ramachandran, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/519,377

(22) Filed: Jul. 23, 2019

(51) Int. Cl.
*G06F 11/14* (2006.01)
*G06F 3/06* (2006.01)

(52) U.S. Cl.
CPC ........ *G06F 11/1458* (2013.01); *G06F 3/0608* (2013.01); *G06F 3/0652* (2013.01); *G06F 3/0673* (2013.01); *G06F 11/1451* (2013.01); *G06F 2201/84* (2013.01)

(58) Field of Classification Search
CPC .......... G06F 3/06; G06F 11/14; G06F 2201/84
USPC .......................................................... 711/162
See application file for complete search history.

(56) References Cited

U.S. PATENT DOCUMENTS

| | | | |
|---|---|---|---|
| 10,664,356 B1* | 5/2020 | Ugur-Ozekinci | G06F 11/1464 |
| 2010/0077130 A1* | 3/2010 | Kwon | G06F 9/4405 711/102 |
| 2013/0024423 A1* | 1/2013 | Doshi | G06F 11/1448 707/640 |
| 2014/0379660 A1* | 12/2014 | Vorsprach | G06F 3/0649 707/654 |

\* cited by examiner

*Primary Examiner* — Christopher B Shin
(74) *Attorney, Agent, or Firm* — Workman Nydegger

(57) ABSTRACT

Systems and methods for deleting backup pieces associated with an application such as a database application. Backup pieces are identified and deleted from the database records and from the backup application.

18 Claims, 3 Drawing Sheets

CENTRALIZED RETENTION AND BACKUP DELETIONS

FIELD OF THE INVENTION

Embodiments of the invention relate to data protection systems, apparatus and methods for performing data protection operations. Embodiments of the invention further relate to systems, apparatus, and methods for deleting backup data sets and more particularly to deleting expired backups based on data protection application retention settings.

BACKGROUND

Data protection operations are performed in order to protect data. Backup operations, for example, are used to generate backups of production data. This allows the production data to be recovered when there is a problem with the production data. Production data can take many forms. Databases are an example of production data. When a backup of a database is generated, multiple backup pieces may be generated. During a recovery operation, the data protection application may discover or identify these pieces and combine them logically in order to present a view of a backup.

For various reasons including resource management, backups are often associated with retention times. In other words, backups typically expire after a retention period is complete. When the retention time is over or when a backup has expired, the pieces of the expired backups can be deleted from the storage system. However, conventional data protection operations face performance issues that complicate the deletion of expired backups. Conventionally, delete operations fail when a piece is not cataloged or when the backup piece cannot be located.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
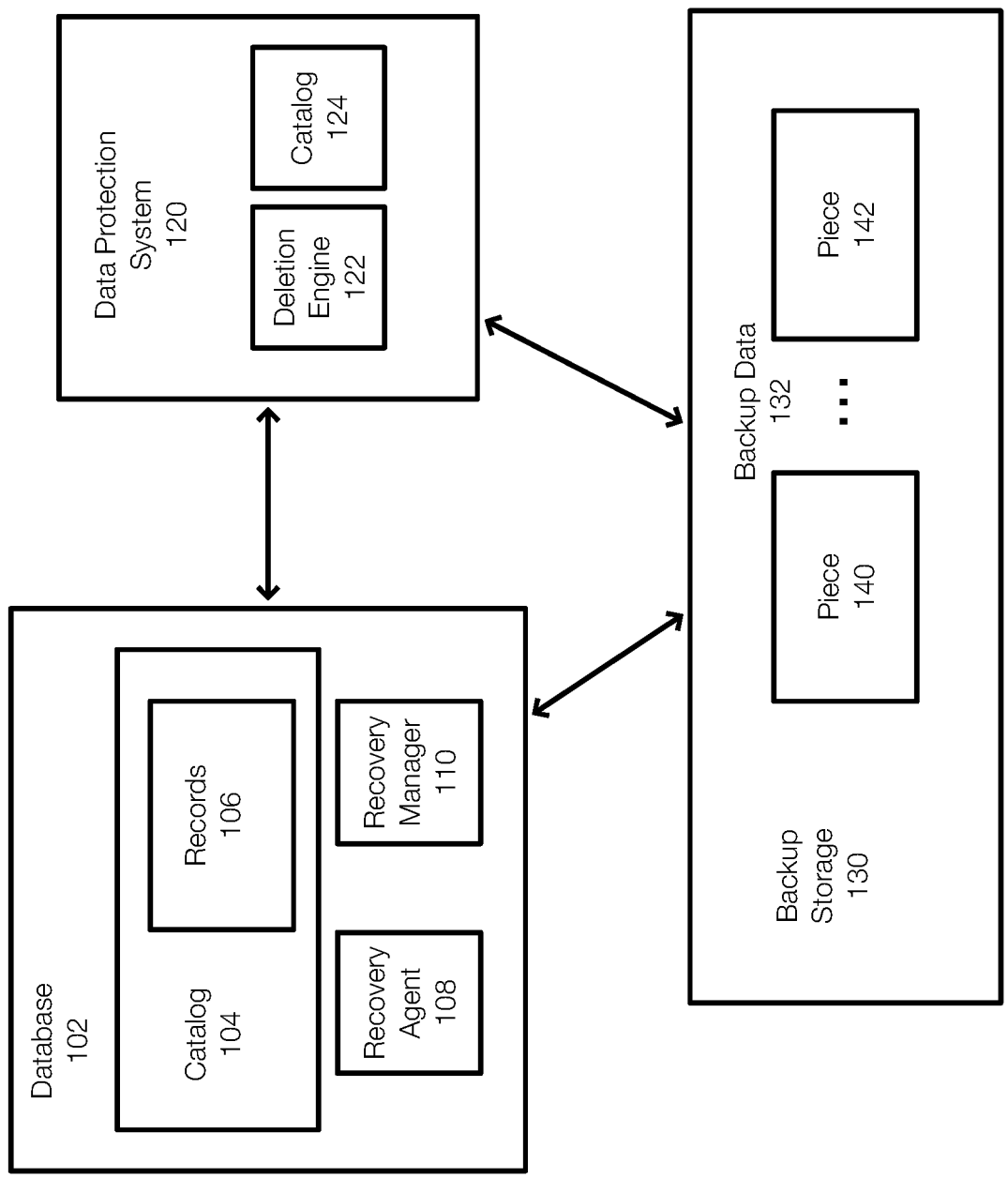
FIG. 1 illustrates an example of a data protection system configured to perform data protection operations including deletion operations on an application such as a database application.

Embodiments of the present invention generally relate to data protection and to systems, methods, and apparatus for performing data protection operations. Examples of data protection operations include, but are not limited to, backup operations, restore operations, replication operations, backup operations, restore operations, replication operations, retention operations, deletion operations (e.g., deleting expired backups or backup pieces), or the like. More particularly, embodiments of the invention relate to systems, hardware, software, computer-readable media, and methods for managing backup data or backup data pieces, including deleting expired backups Embodiments of the invention further relate to deleting and/or expiring backup pieces associated with a database application such as Oracle. Embodiments further relate to deleting or expiring backups or backup pieces based, in some examples, retention settings of a data protection system.

During backup of an application such as a database application, multiple backup pieces may be generated and stored on a storage device such as a backup medium or system (e.g., DELL EMC DATA DOMAIN). The backup pieces may be generated by the database application and stored by the data protection application. The backup pieces may also be replicated to offsite disaster recovery storage. The backup pieces may also be cataloged by the database application in a control file or a catalog database (catalog). Catalog is used herein to refer to the control file and/or the catalog database. The catalog may be used by the database application for backup management. For example, when a backup is generated, the backup pieces are identified in the catalog. Similarly, entries in the catalog are removed during a delete operation.

The data protection application (e.g., DATA DOMAIN, DELL EMC Enterprise Copy Data Management (ECDM)) can discover or identify the backup pieces and logically combine the pieces to present a view of a backup.

Although the database application may include a recovery manager that is configured to manage backup, restore, and recovery capabilities, embodiments of the invention enable the data protection application to set a retention time for the backups (e.g., a user may set a retention or expiration time). Thus, the data protection application can perform data protection operations, such as delete operations, independently of the recovery manager. \

For example, once a backup expires based on retention settings of the data protection application, the data protection application can delete the pieces from the backup storage and remove the references or records maintained by the database application in the catalog or control file.

A recovery agent associated with the data protection application may be installed on or associated with the database server. The recovery agent may be configured to cooperate with a recovery manager to perform data protection operations. The data protection operation may be configured to execute a delete operation based on a script or other instructions that identify the backup pieces to be deleted. When the instructions or script is executed, the database application may invoke a call back to the data protection application using the recovery agent. This call may be received by a delete engine that is responsible for deleting the backup piece from the backup storage or medium. If the deletion is successful, the database application removes the record or reference to the backup piece from the control file or from the catalog.

Embodiments of the invention overcome issues associated with this process. For example, the delete process, when performed by the recovery manager of the database application, may fail to delete a backup piece if there is no entry for the backup piece in the catalog. The delete process may fail if the backup piece is not found on the backup storage device. The delete operation fails as soon as the recovery manager is unable to delete a backup piece for any reason. Plus, no attempt is made to delete any of the remaining backup pieces once the delete operation fails.

This is very problematic in some database environments as it makes it very difficult to successfully complete a delete operation. Launching a delete operation for each backup piece is not a viable solution because it takes time to connect to database and perform the initialization to perform delete operation. For example, even though a delete script containing 1000 backup pieces takes around few seconds to perform, invoking the recovery manager of the database application for each backup piece however, often requires hours for each backup piece.

In some cases, entries for some of the backup pieces are not present in the catalog even though the backup pieces are present on the backup media. This can happen due to various reasons. This may occur when the catalog is restored to an older or previous time or when the administrator un-catalogs or force deletes the backup piece.

In some cases, the backup administrator can delete old backup pieces from the backup media (e.g., based on creation date). This causes an error and the delete operation in this case fails because as media management library would report an error for such backup pieces and the database application, as a consequence, does not remove the corresponding entries from the control file or the catalog. These entries may exist for a long time in the catalog because there is no way to tell if the backup piece has been deleted.

Embodiments of the invention overcome these issues and relate to systems, methods, and apparatus for deleting and/or expiring backup pieces based on retention settings established by the data protection application not the database application.

Embodiments of the invention are able to successfully delete backup pieces from the backup storage system or media and the control file/catalog based on the retention settings of the data protection application.

FIG. 1 illustrates an example of an environment that includes a database application that is backed up by a data protection system. FIG. 1 illustrates a data protection system 120. The data protection system 120 is configured to perform data protection operations for various applications including a database 102. The data protection operations may include, by way of example only, backup operations, recovery operations, deduplication operations, and deletion operations.

In this example, the data protection system 120 includes a deletion engine 122 that is configured to perform deletion operations. The delete engine 122 may cooperate with a recovery agent 110 installed on the database 110 (the database server). The deletion operation, in one example, may include deleting backups or backup pieces associated with backups that have expired or whose retention settings have been satisfied. In other words, the deletion engine 122 is configured to delete backups that are no longer needed. A deletion operation may include deleting backups or backup pieces from the backup data 132 stored in a backup storage 130 and/or to ensure that records maintained by the database 102 and associated with the backups or backup pieces being deleted are also removed from the database 102.

The database application (the database 102), which may include a server and associated storage, includes a catalog 104 (representative of a control file and/or a catalog database) that stores records 106. Each entry in the records 106 identifies a backup piece included in the backup data 132. The database 102 may add entries to the record 106 as backups are created. Ideally, a successful deletion operation deletes both an entry in the records 106 and the corresponding piece from the backup data 132.

The database 102 may also include a recovery manager 112. The recovery manager 112 may also provide or be involved in data protection operations including backup, recovery, and deletion operations. The data protection system 120 may communicate with the database 102, by way of example only, through a database interface.

In one example, the recovery manager 110 may control or perform a backup operation. The resulting backup pieces may be stored in the backup storage 130 by the data protection system 120. The data protection system 122 may also maintain a catalog 124 of the backup pieces 140-142 included in the backup data 132.

Figure 2:
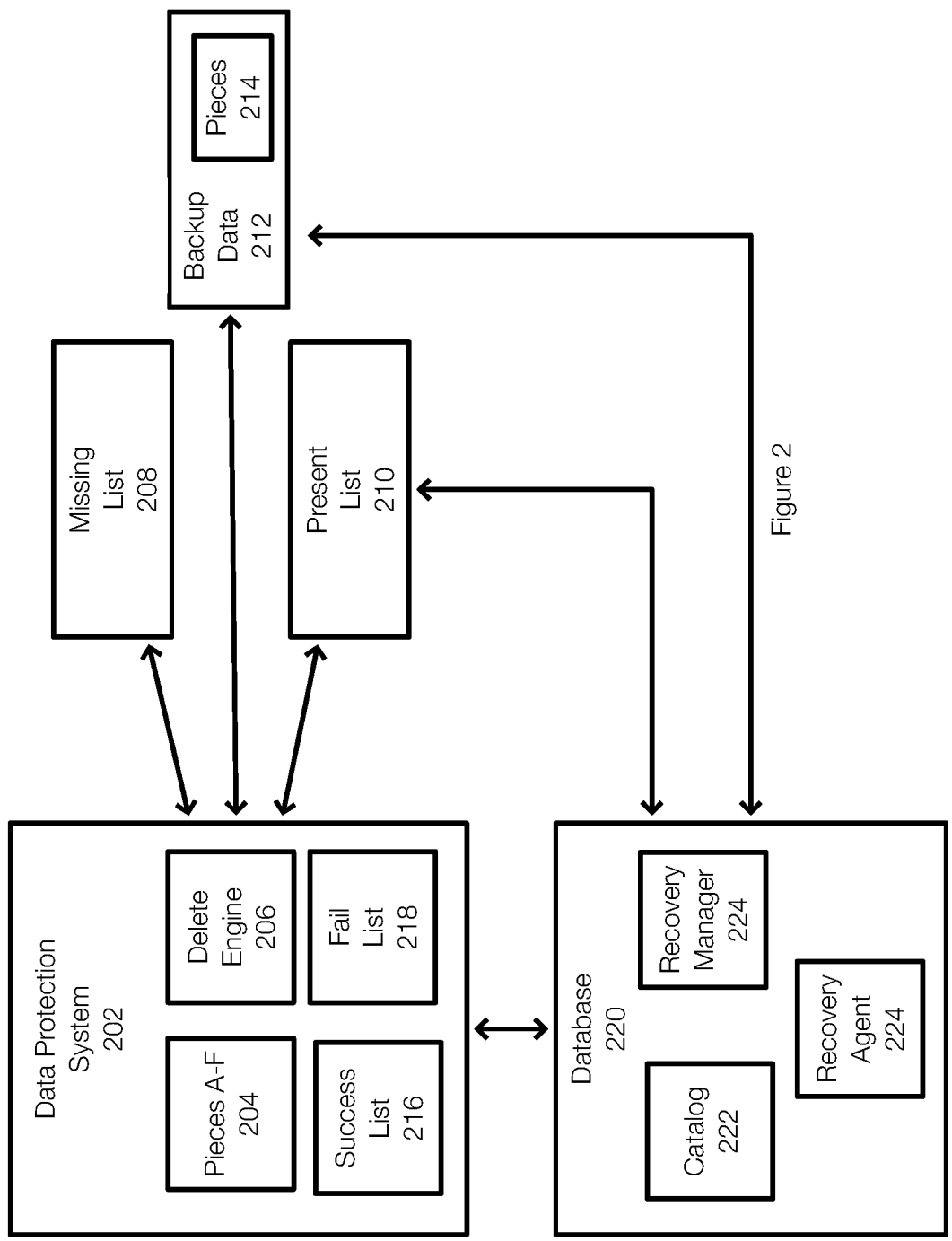
FIG. 2 illustrates an example of performing a deletion operation for an application such as a database application.

FIG. 2 illustrates an example of a deletion operation performed in a database or other application environment. As discussed herein, the data protection system 202 is configured to successfully complete a delete operation that would fail if performed by the recovery manager 224.

FIG. 2 illustrates a data protection system 202 and a database 220. The database 220 includes a catalog 222 that includes records of backup pieces and a recovery manager 224. The catalog 222 may be remote or on a different node. The data protection system 202 includes a delete engine 206.

During a delete operation, a delete request 204 may be generated. In one example, because the delete request 204 is generated by the data protection system 202 or by the delete engine 206, the delete request is based on retention policies or times established by the data protection system 202. Because the backup pieces are stored by the data protection system, the backup pieces can be associated with retention times and a list of backup pieces that have expired and subject to deletion can be identified. Further, the data protection application can identify the backup pieces associated with a backup that has expired. Thus, the delete request 204 may be a list of all backup pieces or backups that have expired and that are to be deleted. The data protection system 202 or, more specifically, the delete engine 206 may then connect to the database 220 using an appropriate interface.

The delete engine 206 queries the catalog 222 based on the delete request 204. The delete engine 206 creates a missing list 208 and a present list 210 based on results of the query. The present list 210 contains or identifies all of the backup pieces in the delete request 204 that are present or referenced in the catalog 222. The missing list 208 contains or identifies all of the backup pieces that are not referenced in the catalog 222.

The missing list 208 and the present list 210 are generated based on expiration dates or retention policies set by the data protection system 202 in one example as previously stated.

Entries in the missing list 208 indicate that the database 220 is unaware of these backup pieces (and illustrates an example of why the recovery manager may fail to successfully complete a delete operation) The backup pieces included in the missing list 208 are consuming space in the backup data 212 stored on a storage device. The backup pieces identified in the missing list 208 can be deleted by the data protection system 202.

When a backup piece identified from the missing list 208 is successfully deleted from the pieces 214 included in the backup data 212, an entry is made in a success list 216. The data protection system 202 can remove references to the backup pieces identified in the success list 216 from its own catalogs and tables (e.g., the catalog 124).

Backup pieces identified in the present list 210 may be added to a script associated with or performed by the recovery manager 224. Because the data protection system 202 has already determined that the backup pieces identified in the present list 210 are represented in the catalog 222, the script performed by the recovery manager 224 is much less likely to fail. When the script is executed, the recovery manager 224 may issue a callback, using the recovery agent 224 to delete the backup pieces on the present list 210 from the backup data 212. The corresponding entries are then deleted from the records in the catalog 222.

In this manner, the data protection system 202 overcomes the performance issues of the recovery manager and ensures that the backup pieces and catalog of the database application are more accurate and efficient.

If the data protection system 202 fails to delete any backup piece during the deletion operation, these backup pieces may be added to a fail list 218. The data protection system 202 may attempt to delete the backup pieces identified in the fail list 218 at a later time. The backup pieces in the fail list 218 are moved to the success list 216 after deletion.

In one example, the deletion of a backup piece may result in a file not found response. If the file is not found, the backup piece is added to the success list 216. Once an entry is added to the success list 216, the corresponding backup pieces in the backup have been deleted and any references (e.g., in the catalog 124) can be removed from the data protection system 202.

For example, the delete request 204 may identify backup pieces A-F (A, B, C, D, E and F). In this example, the catalog 222 may include entries for the backup pieces A-C. Thus, backup pieces A-C are added to the present list 210 and backup entries E-F are added to the missing list 208. A script may then be generated that allows the recovery manager 224 to perform a delete operation for the present list 210, which results in the removal of these entries from the catalog 222 and the deletion of these backup pieces from the pieces 214. The data protection system 202 may delete the pieces E-F directly from the pieces 214 with no interaction with the database 220. If these actions are completed, all are added to the success list 216.

Figure 3:
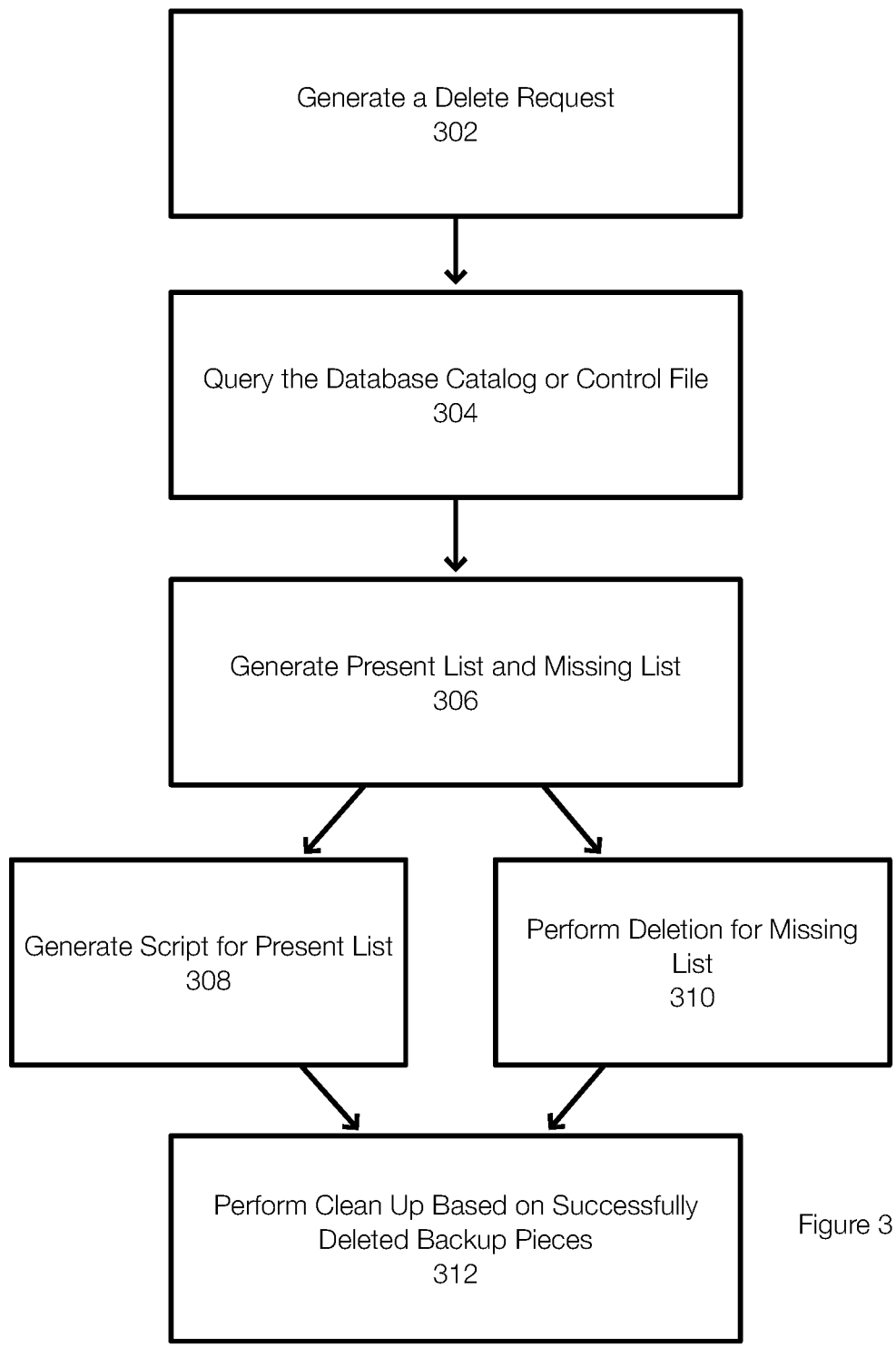
FIG. 3 illustrates a flow diagram of a deletion operation performed by a data protection application.

FIG. 3 illustrates an example of a method for performing a deletion operation. The method shown in FIG. 3 may begin by generating 302 a delete request. For example, the data protection system may evaluate the backup pieces stored in a backup storage to determine or identify which backup pieces have expired or satisfied their retention period. The backup pieces that have expired are included in the delete request and are subject to deletion. The retention or expiration policy may be determined by the data protection system.

Next, the data protection system may query 304 the database catalog or control file. The data protection system can perform, by way of example only, an SQL query using an OCI (Open Catalog Interface). The response or results of the query allow the data protection application to generate 306 a present list and a missing list. The present list identifies which of the backup pieces in the delete request are included in the database's catalog. The missing list identifies which of the backup pieces in the delete request are not included in the database's catalog.

The data protection application can simply delete 310 the backup pieces identified in the missing list from the backup data. When successfully deleted, the backup pieces are added to a success list. The data protection application may generate 308 a script for the backup pieces in the present list.

The script can be performed by the recovery manager of the database application. Thus, the recovery manager may instruct the data protection application to delete the backup pieces and the recovery manager may remove the corresponding entries from the catalog when the backup pieces are deleted. These backup pieces, when deleted, are also added to a success list.

Clean up is then performed 312 based on the successfully deleted backup pieces or based on the success list. In one example, the data protection application may use the success list to remove its own references to the backup pieces.

The data protection application may also maintain a failed list that identifies backup pieces from the missing list that were not initially deleted. Thus, the clean up operations may include reattempting to delete the backup pieces in the failed list, cleaning its own backup catalog, or the like.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a deletion operation, the method comprising:
   generating a delete request, by a data protection system, that identifies backup pieces subject to deletion from a backup storage device;
   querying, by the data protection system, a catalog of an application to determine which of the backup pieces identified in the delete request are present in the catalog of the application, wherein the catalog identifies backup pieces the application believes are stored on the backup storage device;
   receiving results of the query from the application;
   generating, by the data protection system, a present list and a missing list from the results, wherein the present list identifies backup pieces in the delete request that are referenced in the catalog and the missing list identifies backup pieces in the delete request that are not referenced in the catalog, wherein the application is aware of the backup pieces included in the present list and is not aware of the backup pieces included in the missing list;
   deleting, by the data protection system, the backup pieces identified in the missing list from the backup storage device; and generating, by the data protection system, a script that, when executed by the application, allows the application to delete the backup pieces identified in the present list from the backup storage device and remove the backup pieces identified in the present list from the catalog of the application.

2. The method of claim 1, further comprising generating the delete request based on a retention period set by the data protection system.

3. The method of claim 2, wherein the retention period is independent of the application.

4. The method of claim 1, wherein the application comprises a database application including a database server and storage, wherein the catalog stores records that identify backup pieces associated with backups stored by the data protection system.

5. The method of claim 1, further comprising deleting the backup pieces identified in the missing list directly by the data protection system without involvement from the application.

6. The method of claim 1, further comprising generating a failed list that identifies backup pieces in the missing list that are not successfully deleted initially and reattempting to delete the backup pieces that are not successfully deleted initially.

7. The method of claim 1, further comprising:
generating a success list, wherein references to backup pieces successfully deleted by the data protection system are added to the success list; and
adding references to backup pieces from the present list that are successfully deleted to the success list; and
removing the references to the backup pieces identified in the success list from a catalog of the data protection system.

8. The method of claim 1, further comprising performing a backup operation on the application and storing backup pieces generated by the backup operation on the backup storage device of the data protection system.

9. The method of claim 1, further comprising receiving a callback from the application via a recovery agent when deleting backup pieces from the present list.

10. A non-transitory computer readable medium comprising computer executable instructions configured to perform a method for performing a deletion operation in a data protection system, the method comprising:
generating a delete request, by a data protection system, that identifies backup pieces subject to deletion from a backup storage device;
querying, by the data protection system, a catalog of an application to determine which of the backup pieces identified in the delete request are resent in the catalog of the application, wherein the catalog identifies backup pieces the application believes are stored on the backup storage device;
receiving results of the query from the application;
generating, by the data protection system, a present list and a missing list from the results, wherein the present list identifies backup pieces in the delete request that are referenced in the catalog and the missing list identifies backup pieces in the delete request that are not referenced in the catalog, wherein the application is aware of the backup pieces included in the present list and is not aware of the backup pieces included in the missing list;
deleting, by the data protection system, the backup pieces identified in the missing list from the backup storage device; and
generating, by the data protection system, a script that, when executed by the application, allows the application to delete the backup pieces identified in the present list from the backup storage device and remove the backup pieces identified in the present list from the catalog of the application.

11. The method of claim 10, further comprising generating the delete request based on a retention period set by the data protection system.

12. The method of claim 11, wherein the retention period is independent of the application.

13. The method of claim 10, wherein the application comprises a database application including a database server and storage, wherein the catalog stores records that identify backup pieces associated with backups stored by the data protection system.

14. The method of claim 10, further comprising deleting the backup pieces identified in the missing list directly by the data protection system without involvement from the application.

15. The method of claim 10, further comprising generating a failed list that identifies backup pieces in the missing list that are not successfully deleted initially and reattempting to delete the backup pieces that are not successfully deleted initially.

16. The method of claim 10, further comprising:
generating a success list, wherein references to backup pieces successfully deleted by the data protection system are added to the success list; and
adding references to backup pieces from the present list that are successfully deleted to the success list; and
removing the references to the backup pieces identified in the success list from a catalog of the data protection system.

17. The method of claim 10, further comprising performing a backup operation on the application and storing backup pieces generated by the backup operation on the backup storage device of the data protection system.

18. The method of claim 10, further comprising receiving a callback from the application via a recovery agent when deleting backup pieces from the present list.

* * * * *